(12) United States Patent
Weigand et al.

(10) Patent No.: US 8,350,857 B2
(45) Date of Patent: Jan. 8, 2013

(54) METHOD FOR REPRESENTING AN OBJECT

(75) Inventors: Michael Weigand, Gueglingen (DE); Joachim Kuehnemann, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 901 days.

(21) Appl. No.: 11/920,867

(22) PCT Filed: May 18, 2006

(86) PCT No.: PCT/EP2006/062428
§ 371 (c)(1), (2), (4) Date: May 22, 2009

(87) PCT Pub. No.: WO2006/122969
PCT Pub. Date: Nov. 23, 2006

(65) Prior Publication Data
US 2010/0026701 A1    Feb. 4, 2010

(30) Foreign Application Priority Data
May 20, 2005   (DE) .................. 10 2005 023 356

(51) Int. Cl.
G06T 11/20   (2006.01)
G09G 5/02   (2006.01)
(52) U.S. Cl. ........................... 345/443; 345/589
(58) Field of Classification Search .......... 345/443, 345/589–593
See application file for complete search history.

(56) References Cited

U.S. PATENT DOCUMENTS

| | | | |
|---|---|---|---|
| 4,660,028 A | | 4/1987 | Yu |
| 4,849,907 A | * | 7/1989 | Aotsu et al. ............ 345/626 |
| 4,870,286 A | * | 9/1989 | Tobuse ............ 250/492.2 |
| 5,053,759 A | * | 10/1991 | Sato ............ 345/469.1 |
| 5,357,602 A | * | 10/1994 | Ohta ............ 345/442 |
| 5,442,741 A | | 8/1995 | Hughes et al. |
| 5,499,328 A | * | 3/1996 | Martin ............ 345/443 |
| 5,500,924 A | * | 3/1996 | deSilva et al. ............ 345/443 |
| 5,739,825 A | * | 4/1998 | Turner ............ 345/441 |
| 5,867,168 A | * | 2/1999 | Seki et al. ............ 345/427 |
| 6,246,805 B1 | * | 6/2001 | Sanjeev et al. ............ 382/285 |

FOREIGN PATENT DOCUMENTS

| | | |
|---|---|---|
| DE | 198 59 430 | 7/2000 |
| DE | 103 03 278 | 8/2004 |
| EP | 0 837 427 | 4/1998 |

OTHER PUBLICATIONS

International Search Report, PCT International Patent Application No. PCT/EP2006/062428, dated Oct. 24, 2006.

* cited by examiner

*Primary Examiner* — Ryan R Yang
(74) *Attorney, Agent, or Firm* — Kenyon & Kenyon LLP

(57) ABSTRACT

In a method for representing an object in a display, lines together with length information, starting point information and direction information are stored with regard to the object. The representation of the object is generated by a display of the directly adjacent, parallel lines.

22 Claims, 3 Drawing Sheets

METHOD FOR REPRESENTING AN OBJECT

FIELD OF THE INVENTION

The present invention is based on a method for representing an object in a display.

BACKGROUND INFORMATION

Displays are conventional which have pixels, objects to be displayed being imaged onto the pixels of the display, and the pixels being energized accordingly for representing the objects. In that context, an image may be described by the values for color and brightness for each individual pixel. However, quite great storage requirements are necessary for that purpose. Therefore, compression methods are provided in which the data volume can be reduced. So, for example, adjacent pixels disposed in one row which have an identical brightness and an identical color value may be described by this brightness value and color value, as well as a repetition factor. Moreover, other compression methods provide that the depth of color is reduced as inconspicuously as possible for an observer. In that case, pixels which are adjacent and which differ only imperceptibly in their color are described as the same color value. When the corresponding image is represented, the image data must be decompressed from the compressed stored data. German Published Patent Application No. 198 59 430 describes partially precalculating image data and storing the precalculated data in a memory. If an image is to be represented, this precalculated data is recopied into an image memory in order to put it together to form a total image.

SUMMARY

In contrast, the method according to example embodiments of the present invention for representing an object in a display provides that, by representing an image made up of a multitude of stored lines that extend in parallel, it is possible to generate an object representation easily and quickly. In this context, direction information is provided, so that for the most favorable possible representation in the display, the lines are able to be aligned in a preferred direction to simplify the representation. The line data may be read out quickly from a memory and easily processed by an arithmetic logic unit.

It may be provided to in each case store a color progression and/or a color-intensity progression from an initial value to a final value, together with the lines. Instead of having to store a change of color for each individual pixel, by a, e.g., linear calculation of a color value over the length of the line, a color change of an object may easily be produced in a display.

Moreover, it may be provided to store the lines with starting points and end points. Consequently, an unambiguous position in a display may be assigned to one line itself. Alternatively, it is also possible to link the individual lines together, so that the starting point of a line is either adjacent to the starting point of the preceding line, follows the end point of the previous line, or is indicated spatially in relation to the end point of the present line.

Furthermore, it may be provided to store information concerning the properties of the lines in coded, and therefore, e.g., also in compressed form. The memory space needed for a representation may thereby be further reduced.

Furthermore, in the transfer of the lines to a representation in a display, it may be provided to perform an averaging with regard to the pixel structure. Transitions may thereby be made smoother, so that disturbing edge roughenings are avoided in a representation.

It may be provided to switch the areas of the display surface not occupied by the represented object to transparent. The object to be represented may thereby be overlaid with other objects or with a background image in the display.

The utilization of the method according to example embodiments of the present invention for representing an indicator of a measured-value display may be particularly advantageous. In the case of an indicator, especially if the measured value changes quickly, changes must also take place with corresponding speed in the display. To be able to keep the expenditure for an arithmetic logic unit as low as possible, an indicator representation which is as efficient as possible is therefore necessary. Especially in the case of rotatably represented indicators, lines occur which extend at an angle with respect to the pixel direction configured in columns and rows. Indicators configured in such a manner in particular can easily be represented with high quality using the method hereof.

Exemplary embodiments of the present invention are illustrated in the drawing and explained in greater detail in the following description.

DETAILED DESCRIPTION

Example embodiments of the present invention may be used for any display devices. It is especially advantageous for displays in which an image is represented in the form of individual adjacent pixels. For example, these include LCD displays, plasma displays or colored cathode ray tube displays. The method is particularly advantageous when similar objects having a relatively uniform formation, but moved in a different manner, are to be represented in a display. Therefore, the method of example embodiments of the present invention is explained using a display device for measured values in a motor vehicle as an example.

Figure 1:
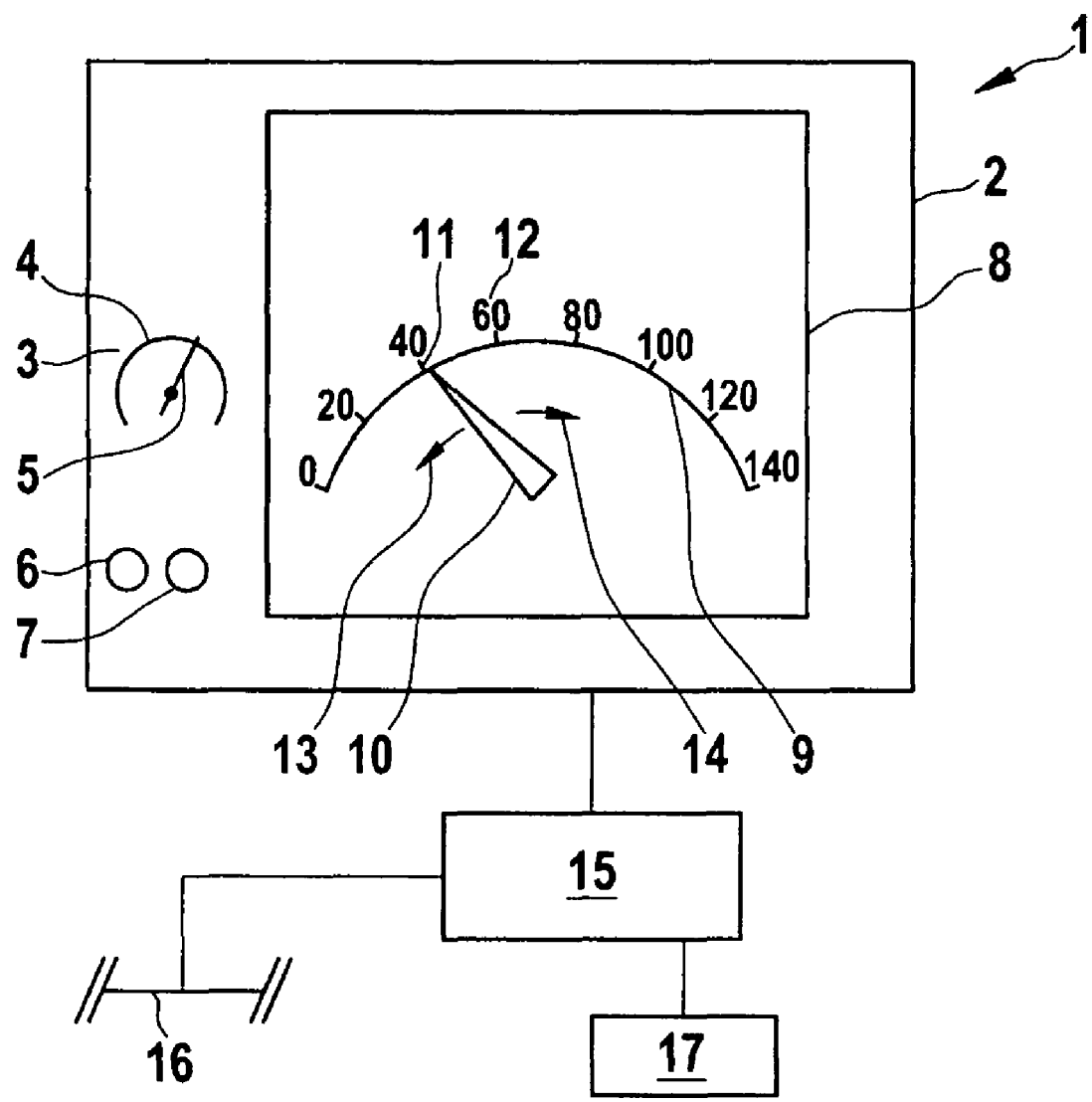
FIG. 1 illustrates a display device according to an example embodiment of the present invention.

FIG. 1 shows a display unit 1 in a vehicle. Display unit 1 has a display 2 which is disposed as a so-called instrument cluster in front of a driver. For example, display 2 has an indicator display 3 having a dial scale 4 and a mechanically driven indicator 5. Symbol-field displays 6, 7 may also be disposed on display 2. In particular, display 2 has a matrix display 8 implemented, for example, as a liquid-crystal display. Matrix display 8 may also be implemented as a laser projection display, for instance, or as a cathode ray tube display. A dial scale 9 is represented in matrix display 8. An indicator 10, likewise represented in matrix display 8, indicates a measured value on dial scale 9, which is represented with scale graduation marks 11 and a scale legend 12. The representation of the indicator is now changed as a function of the measured value to be displayed in such a manner that within the framework of an animated representation, indicator 10 shown moves over dial scale 9 to the left in arrow direction 13 in the direction of a smaller measured value, or to the right in arrow direction 14 in the direction of a larger measured value.

Entire display unit 1 is controlled by an arithmetic logic unit 15. Arithmetic logic unit 15 is connected to a vehicle data bus 16, via which vehicle data is transmitted to arithmetic logic unit 15 for display in display unit 1. For example, this may include the instantaneous vehicle speed detected by a sensor, a tank fuel level, a coolant temperature or an engine speed. Arithmetic logic unit 15 is connected to a memory 17. Memory 17 stores image data or instructions for generating image data, from which an image represented in matrix display 8 is determined by arithmetic logic unit 15.

In the example embodiment shown, first of all dial scale 9, having scale graduation marks 11 and scale legend 12, is represented. Indicator 10 is superimposed on this image. In this context, indicator 10 is represented in a position relative to dial scale 9 corresponding to the measured value to be displayed. To that end, in the manner according to example embodiments of the present invention, the representation of indicator 10, made up of a plurality of directly adjacent, parallel lines, is displayed in matrix display 8; the adjacent, parallel lines when combined, because of their adjacent representation, yield an image of the indicator. The representation of the adjacent lines gives an observer of the display the impression of the indicator in its respective position. Indicator representations in the form of such sets of lines are calculated, for example, by arithmetic logic unit 15 to represent the various indicator positions. In another example embodiment, such sets already precalculated for specific indicator representations, e.g., for specific speed values, may be stored in memory 17.

Figure 2:
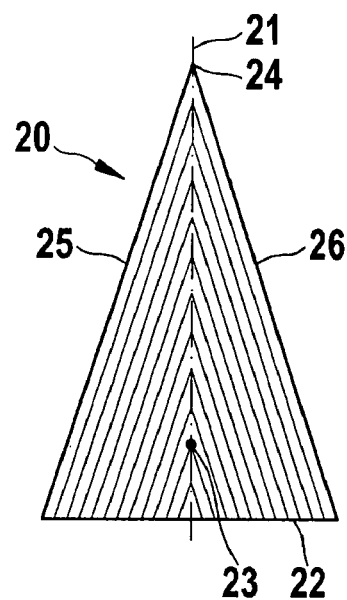
FIG. 2 illustrates a first exemplary embodiment for an object representation, using an indicator as an example.

FIGS. 2 through 5 show various possible indicator representations which are made up of individual lines in the manner of example embodiments of the present invention. FIG. 2 shows an indicator 20 which extends symmetrically with respect to a center axis 21. The indicator tapers starting from an indicator base 22, which, e.g., is disposed in a midpoint of a dial scale that, for example, is semicircular or formed as a half ellipse. In this case, the animated indicator representation is rotated about a point of rotation 23, e.g., situated on center axis 21, in the representation in a matrix display. Indicator 20 tapers to an indicator tip 24. A left indicator flank 25 and a right indicator flank 26, respectively, extend from indicator base 22 to indicator tip 24 and delimit the indicator on the left and right side. In the example embodiment shown, the indicator surface is made up of directly adjacent, parallel lines which, for reasons of clarity, are shown set apart in FIG. 2. In the left indicator half, starting from indicator base 22, in each case these lines extend parallel to left indicator flank 25, up to center axis 21. Correspondingly, in the right indicator half, the lines extend parallel to right indicator flank 26 from indicator base 22 to indicator tip 24. A starting point and an end point of a specific line may be stored in relation to a coordinate system. For example, indicator point of rotation 23 may be defined as the origin of this coordinate system. By storing the starting point and the end point, a direction of the line as well as a length of the line are also predefined. In another example embodiment, a starting point, a length and a direction of the line may also be predefined. The characteristic of the line is also clearly determined by this description. Moreover, a width of the line may also be stored. However, in a further example embodiment, all lines may also have a defined, identical width. In a further example embodiment, the individual lines may also be interlinked in a manner that a starting point is always indicated relative to the last end point of a line. The destination point of the line is specified in relation to the starting point, and so forth. Consequently, starting from a first, initially predefined starting point, an object representation may be positioned at any location in a display.

In a first example embodiment, all lines may have an identical, predefined color. In a further example embodiment, however, a color progression and/or a color-intensity progression from the starting point to the destination point may be predefined for each line. In this context, in an example embodiment, one color value in the color triangle may be predefined for the starting point, and one color value for the end point. The change in color along the line then corresponds linearly to the characteristic of the distance between the two color points in the color triangle. Depending on the distance of a pixel on the line to the starting point and to the destination point, a color value is assigned which has a corresponding distance to the starting value and the destination value of the connecting line in the color triangle. In the same manner, an initial color-intensity value and a final color-intensity value may be predefined. The color intensity then changes in the same manner from the starting point to the end point, e.g., in linear fashion.

In the exemplary embodiment shown in FIG. 2, each line is marked in without interruption from the base of the indicator to the indicator tip or to center axis 21. However, a single line may also be split up into a plurality of partial lines. In this case, lines may be linked in such a manner that a next line begins at an end point of the previous line. For example, a discontinuous, contrary or at least irregular change of a color may thus be achieved in that, in areas having a corresponding color change, the lines are split into corresponding partial lines to which, in each case, linear color changes are assigned, while a complex color progression is realized by the concatenation of the partial lines to form the total line.

Figure 3:
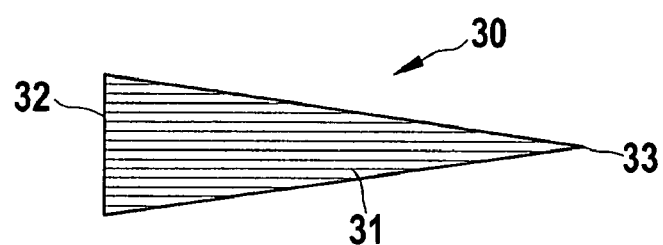
FIGS. 3 to 5 illustrate further indicator representations.
Figure 4:
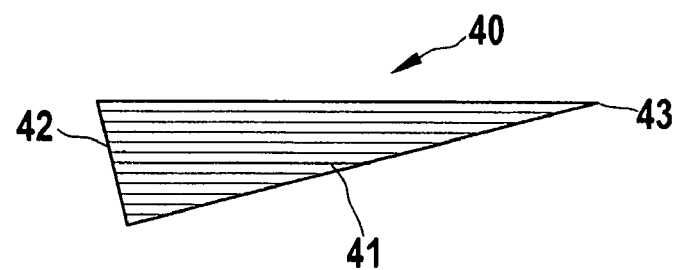

FIG. 3 shows a further exemplary embodiment for an indicator representation in which all lines 31 in an indicator 30 extend in parallel. In the exemplary embodiment shown in FIG. 3, starting from an indicator base 32, these lines extend perpendicular to indicator base 32 up to an indicator tip 33, and therefore parallel to the main alignment of the indicator. In a first example embodiment, indicators pointing in various directions may be represented in such a manner that they are made up of lines which are aligned in accordance with the main alignment of the indicator. With a change in the indicator alignment, the alignment of the lines then also changes. However, in a further example embodiment, it is also possible to limit the alignment within matrix display 8 to several preferred directions. So, for example, only alignments at a distance of 22.5° to each other may be provided. One possible representation of an indicator in such a case is shown in FIG. 4. Compared to the alignment in FIG. 3, the indicator in FIG. 4 is rotated slightly corresponding to an arrow direction 13 according to FIG. 1. At the same time, however, the alignment of lines 41 corresponds to the alignment of lines 31 in FIG. 3. However, lines 41 in indicator 40 no longer extend in the main direction of the indicator from indicator base 42 to indicator tip 43.

Figure 5:
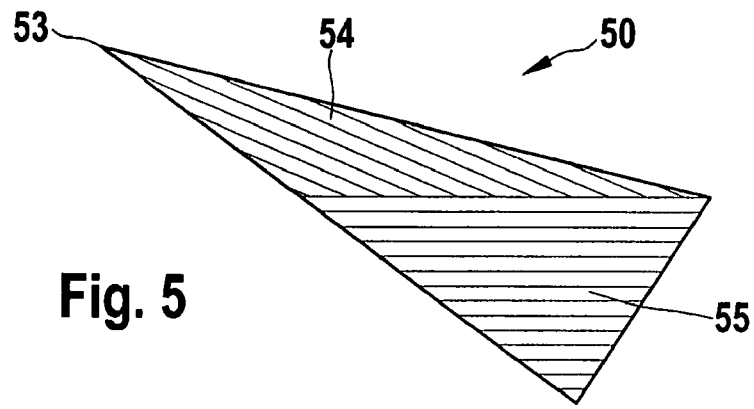

FIG. 5 shows another exemplary embodiment in which, within an indicator 50, the lines forming the indicator are aligned in the direction of indicator tip 53 in a first region 54, while in s second region 55, the lines have a different alignment.

Figure 6:
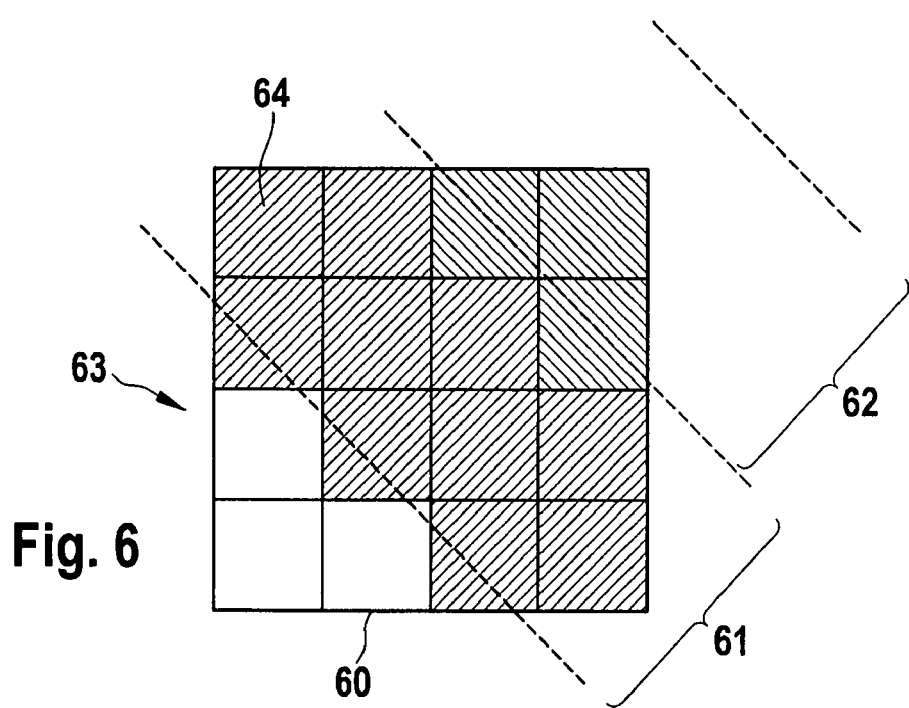
FIG. 6 illustrates an averaging for the representation of a pixel which is cut from a line.

FIG. 6 shows an example embodiment for an optimal display of a line in matrix display 8. To that end, a single pixel 60 of the display is shown in FIG. 6. In the transfer of the line data from memory 17, arithmetic logic unit 15 has ascertained a first line 61 and a second line 62 which at least partially intersect pixel 60. A further area 63 of pixel 60 remains free. To ascertain the energizing value for pixel 60, the pixel is split by calculation into a plurality of subpixels. For example, in the case of a cathode ray display or an LCD, the energizing value may be the brightness value for the RGB subpixels of pixel 60.

In the exemplary embodiment shown, 16 subpixels in four rows and columns, respectively, are utilized for the calculation. By way of example, only one subpixel 64 is provided with a reference numeral. For example, pixel 60 is split up in such a manner that 32 rows and 32 columns are considered. In the exemplary embodiment shown, two lines 61, 62 at one edge of an indicator are shown. In this case, for example, the intention is for first line 61 to be light blue and second line 62 to be dark blue, in order to permit a smooth transition at the edge of the indicator. Each subpixel is assigned the color which predominantly fills up the respective subpixel. For the subpixels not covered, a background color value, e.g., black, is taken into account. In a further example embodiment, a Gaussian filtering may be carried out with respective adjacent subpixels. Summing-up and averaging is carried out over all subpixels. The final color value of pixel 60 is yielded from this averaging. In another example embodiment, a Gaussian filtering may also be carried out with respective adjacent pixels. In so doing, the color values of each pixel are ascertained from the corresponding value of the pixel itself and the eight points surrounding it, using a weighted addition. For example, in this connection, a factor 4 may be taken into account for the pixel itself, a factor 2 for the points, situated above and to the side, and a factor 1 for the points situated diagonally. In a further example embodiment, in calculating the individual pixel itself, the subpixels taken into account may also be expanded by subpixels of adjacent pixels.

In addition to the consideration of the color pixel in a representation, it is also possible to predefine for the individual lines, a so-called alpha value which indicates a transparency with respect to another representation underlying the object representation. If the alpha value is 1, then the object representation to be undertaken covers all other representations lying under it. If, for example, the alpha value is 0.5, a mixture takes place between the subjacent image and the other superjacent object.

In a first example embodiment, for those subpixels in which there is no line, thus, for the three subpixels in the left lower corner of pixel 60, an alpha value of 0 will be assumed. This means that in these areas, no cover by the lines of the indicator is to take place. In order to permit a smooth transition between the indicator and the background, those color values which correspond to the background image, thus, for example, according to FIG. 1, to the background of the dial scale, are adopted for the three subpixels. These values are taken into account for the averaging to ascertain the value of pixel 60. For instance, if an alpha value of 0.75 is assumed for the indicator, then the color value of the background image in each case is entered at one quarter into the calculation of the energizing value for the pixel. Therefore, a background image, e.g., a dial-scale value or a warning symbol represented, can remain partially discernible even if there is a cover by the indicator.

In a further example embodiment, the memory space needed for storing the representation may be reduced by storing the line data in coded form. First of all, the line data for representing the specific object is generated including the appropriate application instructions in order to be able to assemble an image again from the respective line data. In so doing, the generated line data may be split up into two types of character instructions: On one hand, they are positioning instructions relative to an instantaneous position; on the other hand, they are character commands for a line with specification of the length, the starting color value or the transparency value and a difference with respect to this starting value at the end point of the line. In this context, several of these instructions will probably also appear multiple times in the command sequence for the depiction of an image. In order to reduce the memory space needed, the frequency of the instructions over all stored images is now ascertained. Instructions occurring particularly frequently are assigned a 1-byte instruction code, while the specific instruction is stored in an associated table. Less frequent instructions are assigned a 2-byte code, while instructions that are even more infrequent are assigned a 3-byte or a 4-byte code, respectively. The character instructions for all images are stored in memory 17. An image may be stored in such a manner that specific instruction codes are stored for the generating lines, so that the generation of the line representations is written in compressed fashion in the instruction codes, and with the aid of the stored table, can be extracted again from the compressed instruction codes.

What is claimed is:

1. A method for representing an object in a display, comprising:
   Storing, using a processor, lines together with length information, starting point information and preferred direction information with regard to the object; and
   Generating, using a processor, a representation of the object by a representation of the stored lines such that a plurality of directly adjacent, parallel lines are displayed for representing the object.

2. The method according to claim 1, wherein the lines are stored with starting points and end points.

3. The method according to claim 1, wherein the information concerning the lines is stored in coded form.

4. The method according to claim 1, wherein the object to be represented is an indicator of a measured-value display.

5. A method for representing an object in a display, comprising:
   Storing, using a processor, lines together with length information, starting point information and direction information with regard to the object; and
   Generating, using a processor, a representation of the object by a representation of the stored lines such that a plurality of directly adjacent, parallel lines are displayed for representing the object;
   wherein a color progression from an initial color value to a final color value is stored with a line, and the color of the line changes from a starting point to an end point in accordance with the color progression.

6. A method for representing an object in a display, comprising:
   Storing, using a processor, lines together with length information, starting point information and direction information with regard to the object; and
   Generating, using a processor, a representation of the object by a representation of the stored lines such that a plurality of directly adjacent, parallel lines are displayed for representing the object;
   wherein a color-intensity progression from an initial color value to a final color value is stored with a line, and the color intensity of the line changes from a starting point to an end point in accordance with the color-intensity progression.

7. A method for representing an object in a display, comprising:
   Storing, using a processor, lines together with length information, starting point information and direction information with regard to the object; and Generating, using a processor, a representation of the object by a representation of the stored lines such that a plurality of directly adjacent, parallel lines are displayed for representing the object;

wherein in a transfer of the lines to a pixel structure of a display, the image information for individual pixels is averaged.

8. A method for representing an object in a display, comprising:

Storing, using a processor, lines together with length information, starting point information and direction information with regard to the object; and Generating, using a processor, a representation of the object by a representation of the stored lines such that a plurality of directly adjacent, parallel lines are displayed for representing the object;

wherein an area of the display surface in which no object is represented is switched to transparent.

9. A display device, comprising:

a display having pixels;

a control device of the display; and a memory, line characteristics for an object representation being stored in non-volatile manner in the memory;

wherein the control device is configured to generate an image representation such that the control device retrieves data of lines assigned to an object to be represented from the memory, and displays the lines assigned to the object to be represented so that the lines extend adjacent and parallel in the display to represent the object;

wherein the line characteristics for the object representation include at least length information, starting point information and preferred direction information with regard to the object.

10. The device according to claim 9, wherein a color progression from an initial color value to a final color value is stored with a line, and the color of the line changes from a starting point to an end point in accordance with the color progression.

11. The device according to claim 9, wherein a color-intensity progression from an initial color value to a final color value is stored with a line, and the color intensity of the line changes from a starting point to an end point in accordance with the color-intensity progression.

12. The device according to claim 9, wherein the lines are stored with starting points and end points.

13. The device according to claim 9, wherein the information concerning the lines is stored in coded form.

14. The device according to claim 9, wherein in a transfer of the lines to a pixel structure of a display, the image information for individual pixels is averaged.

15. The device according to claim 9, wherein an area of the display surface in which no object is represented is switched to transparent.

16. The device according to claim 9, wherein the object to be represented is an indicator of a measured-value display.

17. The device according to claim 9, wherein a color progression from an initial color value to a final color value is stored with a line, and the color of the line changes from a starting point to an end point in accordance with the color progression.

18. The device according to claim 17, wherein the lines are stored with starting points and end points, wherein the information concerning the lines is stored in coded form, and wherein in a transfer of the lines to a pixel structure of a display, the image information for individual pixels is averaged.

19. The device according to claim 17, wherein an area of the display surface in which no object is represented is switched to transparent, and wherein the object to be represented is an indicator of a measured-value display.

20. The device according to claim 9, wherein a color-intensity progression from an initial color value to a final color value is stored with a line, and the color intensity of the line changes from a starting point to an end point in accordance with the color-intensity progression.

21. The device according to claim 20, wherein the lines are stored with starting points and end points, wherein the information concerning the lines is stored in coded form, and wherein in a transfer of the lines to a pixel structure of a display, the image information for individual pixels is averaged.

22. The device according to claim 20, wherein an area of the display surface in which no object is represented is switched to transparent, and wherein the object to be represented is an indicator of a measured-value display.

* * * * *